US012223356B2

(12) United States Patent
Shuvaev et al.

(10) Patent No.: US 12,223,356 B2
(45) Date of Patent: Feb. 11, 2025

(54) SYSTEMS AND METHODS FOR A PROCESS CHECKLIST GENERATOR

(71) Applicant: Nintex UK Ltd, London (GB)

(72) Inventors: Dmitry Shuvaev, London (GB); Shaun Field, London (GB)

(73) Assignee: Nintex UK Ltd., London (GB)

( * ) Notice: Subject to any disclaimer, the term of this patent is extended or adjusted under 35 U.S.C. 154(b) by 659 days.

(21) Appl. No.: 17/510,184

(22) Filed: Oct. 25, 2021

(65) Prior Publication Data

US 2022/0129319 A1    Apr. 28, 2022

Related U.S. Application Data

(60) Provisional application No. 63/104,964, filed on Oct. 23, 2020.

(51) Int. Cl.
*G06F 9/50* (2006.01)
(52) U.S. Cl.
CPC ................. *G06F 9/5027* (2013.01)
(58) Field of Classification Search
CPC .............. G06F 9/5027; G06Q 10/06
See application file for complete search history.

(56) References Cited

U.S. PATENT DOCUMENTS

| | | | |
|---|---|---|---|
| 2005/0209903 A1* | 9/2005 | Hunter | G06Q 10/06316 705/7.26 |
| 2010/0023921 A1* | 1/2010 | Chaar | G06Q 10/06 717/102 |
| 2010/0293136 A1* | 11/2010 | Watanabe | G06Q 10/06 707/E17.008 |
| 2019/0286462 A1* | 9/2019 | Bodnick | G06F 9/453 |

* cited by examiner

*Primary Examiner* — Kenneth Tang
(74) *Attorney, Agent, or Firm* — Perkins Coie LLP

(57) ABSTRACT

Disclosed herein are systems, methods, and devices for converting a static and non-functional electronic mapped process of a programmatic workflow into a functional, user-interactive process checklist that tracks and manages the steps of the mapped process and enables the process's steps to be completed and accounted for. The process checklist provides instant visibility into the status and progress of the workflow's underlying process, with responsibilities and handoffs being clear and procedures well-documented; and enables users to engage with the process checklist so that the workflow and its underlying mapped process can progress. The process checklists generated from the systems and methods disclosed herein are dynamic and interactive such that they engage users collaboratively in a visual, easy-to-use solution and that lets users map, manage, and execute the processes they know best—thus improving process-management computer systems with better communication, collaboration, and compliance across multiple users and computer systems.

20 Claims, 12 Drawing Sheets

FIG. 9

| Process Management Challenges | Benefits and Use Cases | |
|---|---|---|
| Governance / C level Execs<br>• Need records of compliance<br>• Need to improve cross team communication<br>• Continually improve<br>• Multiple tools for management / compliance / communication | PROCESS OWNER & EXPERT<br>Problems documented and improvements made | GOVERNANCE<br>Compliance-Evidence of process being followed. Continuous improvement |
| The Process Owner & Expert<br>• Are our processes being followed?<br>• What is the status of processes currently being done?<br>• Where is the evidence of the process being kept?<br>• How to keep quality of process output high?<br>• Need to set deadlines for process completion<br>• Are there any issues outside the normal flow of the process?<br>• Any feedback on a particular undertaking of the process?<br>• How to improve based on feedback? | Process usage<br>Evidence that process is being followed | Compliance<br>Records of each execution of a process. Who. What. When. |
| | Feedback from the field<br>Participants comment and attach evidence as they go | One tool<br>Single source for process management and compliance |
| Process Participants<br>• Users completing processes from memory<br>• Not using the single source of truth<br>• Coordination with other participants is difficult<br>• Completing the same process for different clients/instances<br>• When is it due? | Incremental improvement<br>Refine process based on participant feedback | Process efficiency<br>Improve cross team communication |
| | PROCESS PARTICIPANTS<br>Improved cross team communication and coordination | |
| | Use the process as you do the process<br>Follow each activity and check it off once done | |
| | Ready when you are<br>Once previous step is completed next user is notified | |
| | Sign off on the go<br>Check off items from email, dashboard, or checklist itself | |

SYSTEMS AND METHODS FOR A PROCESS CHECKLIST GENERATOR

CROSS-REFERENCE TO RELATED APPLICATIONS

This application claims priority and benefit to U.S. Provisional Application No. 63/104,964, filed on Oct. 23, 2020, titled Systems and Methods for a Process Checklist Generator; the contents of which are incorporated herein by this reference as though set forth in their entirety.

FIELD OF USE

The present disclosure relates generally to the field of process-management systems. More specifically, the disclosure relates to enhanced systems, methods, and processes for a visual programming tool that automatically converts an electronic mapped process that is static and non-functional into a standardized and dynamic process checklist that is interactive and functional. Embodiments of this disclosure provide systems, methods, and processes that improve the efficiency of a computer system by, among other improvements, enabling computers to convert a static mapped process into a user-interactive process checklist.

BACKGROUND

A programmatic workflow is a flow-management technology that coordinates interactions between people and software systems. More specifically, a workflow is an electronic tool that coordinates, initiates, delegates, and controls the steps and systems that are necessary to complete a particular process. Workflows automatically move tasks from one stage to the next—and often, from one person and system to the next—until the overall job is complete. In doing so, workflows may interact with a various number of users and electronic systems. For example, when a company hires a new employee, a workflow may automatically carry out all the required tasks for onboarding the new employee from one stage to the next, such as collecting signatures from various departments, obtaining necessary information directly from the employee, and ensuring both the company and employee receive all necessary documents prior to the employee beginning employment. Directly related to workflows are electronic mapped processes, which serve as the backbone of the workflow by organizing, documenting, and visually providing the workflow's underlying process. A mapped process often shows the workflow's activities (i.e., tasks), performance of the activities, who or what system perform those activities, and what artifacts may be generated and/or used within that process. The efficiency and effectiveness of a process has a direct effect on a user's experience and bottom line because it is what dictates how the corresponding workflow will function.

But while a mapped process can be manually captured or refined, it is a static product incapable of executing the workflow's steps or activities on its own. Furthermore, issues in the electronic execution of the processes through programmatic workflows may arise. For example, when activities cross the line between groups or locations, there may be costly disconnects as one group waits on another, or when procedures are left unattended while waiting for the next group to take action—all because the existing technology can only provide mapped processes, which are incapable of addressing issues related to the execution of the mapped process. Similarly, the lack of actual control and visual insight regarding the timing of future steps may slow completion of a process down, with the user's business subsequently slowing down as well. And a lack of understanding in knowing where the execution of a process stands, and with whom, can impede management-level users in recognizing opportunities to further optimize with automation solutions—again, because current technology does not provide functional mechanisms for addressing these issues.

Thus, what is needed are systems, methods, and devices that enable the conversion of an electronic mapped process into a dynamic and interactive process checklist that: (i) dictates the successful completion of a mapped process's steps; (ii) provides instant visibility into the status and progress of the workflow's underlying mapped process, with responsibilities and handoffs being clear and procedures well-documented; and (iii) enables users to engage with the process checklist so that the workflow and its underlying mapped process can progress. Additionally, the process checklists generated from the systems and methods disclosed herein should be dynamic and interactive such that they engage users collaboratively in a visual, easy-to-use solution and that lets users map, manage, and execute the processes they know best—thus improving process-management computer systems with better communication, collaboration, and compliance across multiple users and computer systems.

SUMMARY OF THE DISCLOSURE

The following presents a simplified overview of the example embodiments in order to provide a basic understanding of some embodiments of the present disclosure. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

This disclosure is directed to systems, methods, and devices for a process-checklist generator ("Checklist Generator") that converts an electronic mapped process into a process checklist that tracks and manages the steps of the corresponding mapped process and enables the steps to be completed and accounted for. The generated process checklist may comprise the activities from a process and provide options such that the activities can be tracked, acted on, and marked as completed; thus improving computer systems by providing more compliance control for optimal process management and instant visibility into the status and progress of the mapped process while ensuring that procedures are well documented, responsibilities and handoffs are clear, and new opportunities for efficiency and effectiveness are highlighted. Process checklists improve computer systems by enabling computers to function as a tool for the manual validation of a process and for identifying and implementing process automation.

In a preferred embodiment, the Checklist Generator receives a request for converting an electronic mapped process into a corresponding user-interactive process checklist. The Checklist Generator identifies the specific electronic mapped process that is to be converted; wherein the mapped process likely resides in a memory component of the Checklist Generator or within a third-party server. The mapped process comprises one or more activities, which the Checklist Generator also identifies. The activities may comprise data identifying a sequential relationship between the activities in relation to each other as well as data identifying a task to be completed by a user, whether that user is an individual person or a computer system. The Checklist Generator then converts the identified activity or activities into a digital instance, which comprises creating a user-interactive feature based on the data identifying the task, wherein the user-interactive feature comprises a data-entry component that is related to completion of the task and that allows for a corresponding and/or relevant data input. The Checklist Generator configures the digital instances to be in sequential order based on the data for identifying a sequential relationship for the activities; and then it generates the corresponding user-interactive process checklist, which comprises the digital instance(s) and a visual representation of the task-data, such as through a text or image.

In one embodiment, the Checklist Generator generates process checklists that keep all participants notified of when their input or participation in a specific process is required, thus reducing potential lags or breakdowns at key points, and allowing users to append notes or files that relate to process completion. The process checklists may further enable users to easily log documentation relevant to the process, comment on the process, mark tasks as completed, and receive notifications for key events, such as when exceptions occur, or a process breaks down. Process checklists generated by the Checklist Generator can simplify auditing, while time-stamped completions provide granular insight into process execution and meeting compliance standards. For example, in the common workplace-process of employee onboarding with cross-department activities, each activity in the onboarding process can be tracked as part of the process checklist to enforce process compliance and ensure a great onboarding experience for a new employee.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The accompanying drawings, which are incorporated in and constitute a part of this specification, illustrate embodiments of the disclosure and together with the general description of the disclosure given above and the detailed description of the drawings given below, serve to explain the principles of the disclosure. In certain instances, details that are not necessary for an understanding of the disclosure or that render other details difficult to perceive may have been omitted.

FIG. 9 is an outline generally providing novel benefits of a process-checklist generator as disclosed herein.

DETAILED DESCRIPTION OF EMBODIMENTS

Before the present systems and methods are disclosed and described, it is to be understood that the systems and methods are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1A:
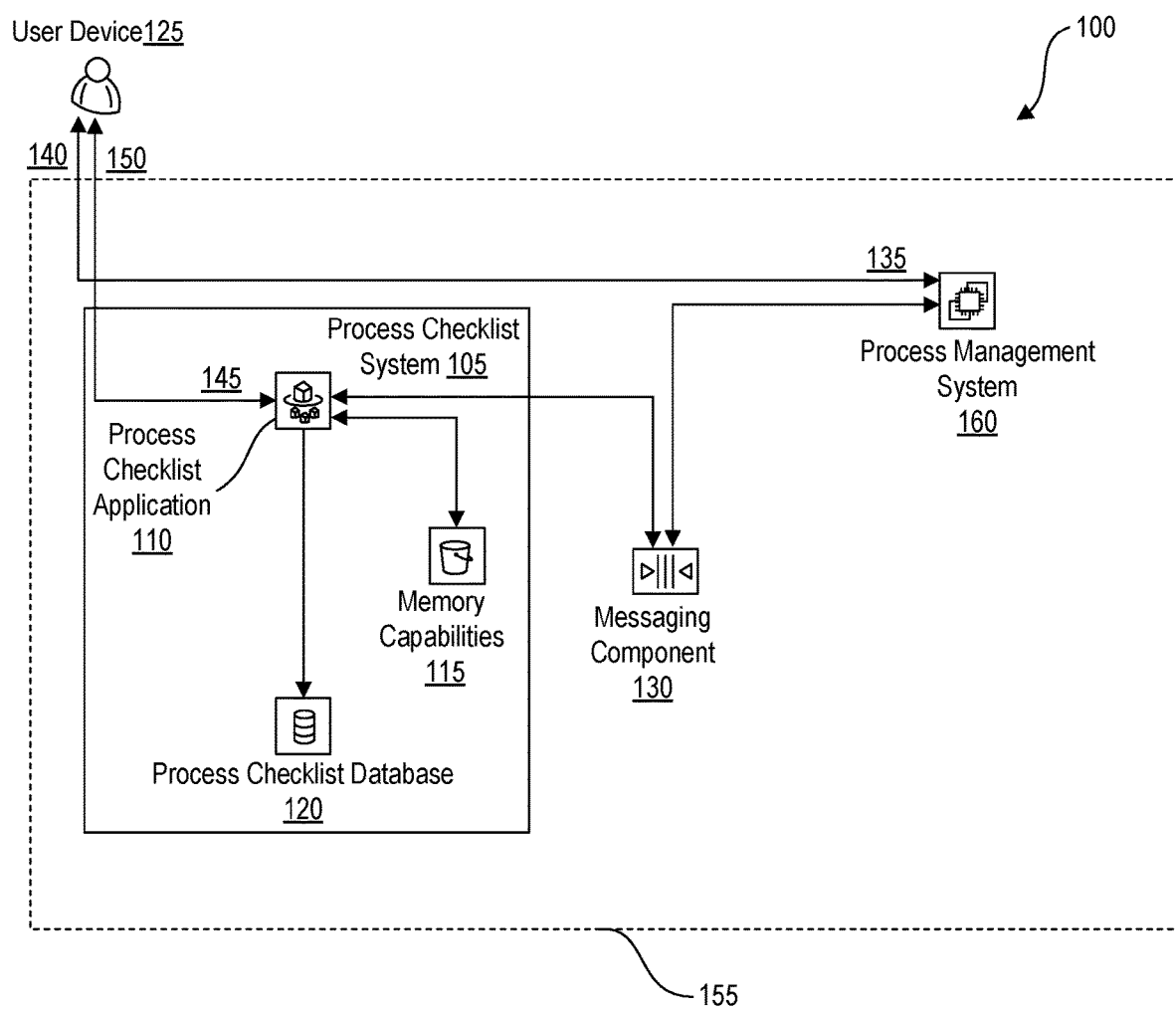
FIG. 1A is a schematic diagram generally illustrating an embodiment of a process-checklist generator as disclosed herein.

FIG. 1A is a schematic diagram generally illustrating an embodiment of a process-checklist generator as disclosed herein. As shown in FIG. 1, a Checklist Generator 100 may generally comprise a process checklist system 105. The process checklist system 105 may comprise elements for converting a mapped process into a process checklist and comprise elements for configuring, storing, and displaying one or more process checklists. This may include displaying a single checklist or list(s) of checklists for a single process or application tenant (user of the checklist). The process checklist system 105 may track and compare executions of a process over time; and it may show the timing for when activities were completed and by who. The process checklist system 105 may provide mechanisms for storing evidence and provide commentary on how the process was executed—allowing for people to review and improve based on previous experience. The process checklist system 105 may comprise a process checklist application 110, memory capabilities 115, and a database 120. The process checklist system 105 enables users to filter and access the full history of stored checklists for an application tenant. The process checklist system 105 may communicate (by sending and receiving data to/from) with one or more user devices 125 (such as a personal computer), with a messaging component 130, and with the process management system 160. A Checklist Generator 100 may also comprise a process management system 160. The process management system 160 may be defined as an infrastructure for the setup, performance, and monitoring of mapped processes and corresponding process checklists. A process management system 160 may comprise any of the following parts: user designations, identification of roles that the users are assigned to, and the mapped process from which a process checklist is generated. A Checklist Generator 100 may further comprise a messaging component 130. Examples of messaging components 130 comprise a message bus or message broker, which enable the different systems to communicate through a shared set of interfaces.

The process checklist application 110 and the process management system 160 may communicate via the messaging component 130 to send and receive information. This may include information specific to the user 125 that requested the process checklist and to the process from which the process checklist is derived. The process checklist application 110 may also send and receive such information from the process checklist database 120 and the memory capabilities 115. The dashed line 155 serves the purpose of showing that the Checklist Generator 100 may comprise both the process checklist system 105 and the process management system 160, such that they are subparts of a single system. In other embodiments, the Checklist Generator 100 may comprise the process checklist system 105 and not comprise the process management system 160.

In one embodiment, the process checklist application 110 comprises checklist-generation capabilities and a checklist-execution engine. Checklist-generation capabilities make it possible for any mapped process to be used as a template for any number of digital instances within the process checklist. These instances can be used to coordinate the execution of the process via the process checklist. Using the information within the process, the configuration of each instance is simplified. Checklist-generation capabilities may convert each activity represented in the process into a process-checklist digital instance, after which, the process-checklist digital instance may be assignable to an individual for completion. Digital-instance assignees are suggested based on the role defined in the process. For example, a name and the assignment of the first digital instance may only be required to initiate the process and send a first notification and start execution of the process. This may include standard activities, links to sub-processes, decision points which change the flow of the process, and optional sub-processes that may or may not be actioned to complete a process checklist. In one embodiment, the process checklist application 110, through its checklist-generation capabilities, may accept a documented process in various object formats, such as a format that conforms to a defined JavaScript object notation (JSON) schema. It then converts the accepted object into a process checklist ready for execution. In addition, it may generate a default name for the process checklist as well as maintain references back to the original process within the process management system 160, the version it was templated from, who created the process checklist, and the date at which it was created.

In an embodiment, the checklist-execution engine of the process checklist application 110 is responsible for managing the completion of the process checklist. Its primary responsibility is to notify users when there are digital instances within the process checklist that are required to be completed. It may also notify the process-checklist creator of when digital instances are completed. The timing of these notifications can be driven by the flow of the process and occur when previous digital instances in the process checklists have been marked as completed by another user. Notifications may come in the form of an email to a user or via a dashboard of required actions. Users may indicate a digital instance is completed by simply clicking a "Marked as Done" option. A one-time usage token in this option can be used to identify who responded when completing the digital instance—meaning the user does not need to authenticate and log in to the system to mark process-checklist digital instances as completed.

For auditing purposes, the checklist-execution engine may also record who and when the digital instances are marked as completed. However, the user who completed a digital instance may retrospectively change this date. Once all required digital instances on the process checklist are complete, the Checklist Generator will automatically change the state of the process checklist to completed and record the completion date. In addition, the checklist-execution engine may track due dates for each digital instance. These may be set per digital instance in the checklist or based on the due date of the overall process checklist. Notifications will indicate whether they are pending or overdue, depending on the date. The due dates do not drive when notifications are delivered and instead simply provide an indication of the execution state of the process checklist in relation to a set schedule.

The checklist-execution engine may also carry out simple, dynamic process flows when completing the process checklists. These may include: (i) Decisions, the subsequent activities that are visualized and need to be completed are dependent on the outcome of the decision; (ii) Parallel Activities, where the process is defined such that more than one activity may be completed at once and wherein all responsible parties are notified; and (iii) Optional Steps, a step can be marked as skipped, and the checklist may still be considered complete.

In one embodiment, the Checklist Generator may be accessed directly through the mapped process. For example, a mapped process may have a "Checklists" option that, when selected, provides the option to convert the process into a process checklist. The process checklist may be automatically named with the process name, time, and date of creation or may be customized to suit. The Checklist Generator enables a user to assign each activity in the process checklist—and thus the corresponding process—to specific users, and the Checklist Generator may generate suggestions based on the process's data and how it relates to individual users.

Figure 1B:
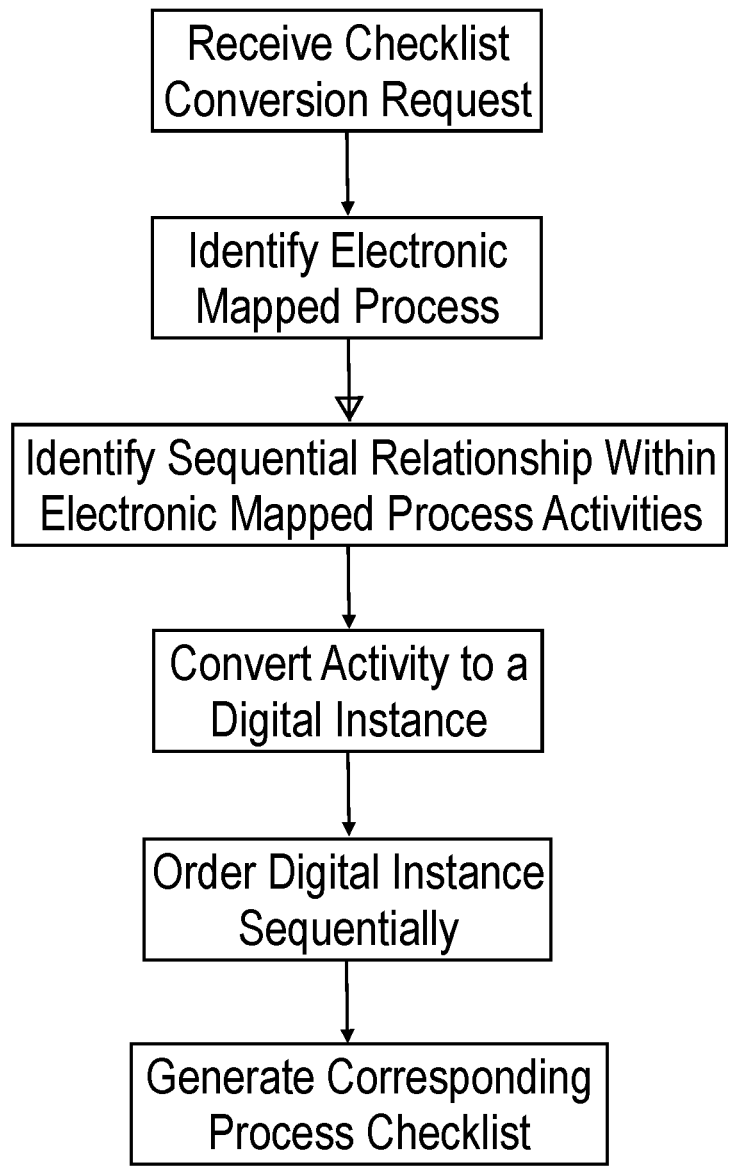
FIG. 1B is a schematic diagram generally illustrating an embodiment of a process-checklist generator as disclosed herein.

FIG. 1B is a schematic diagram generally illustrating an embodiment of a process-checklist generator as disclosed herein. In one embodiment, as shown in FIG. 1B, a Checklist Generator receives a request for converting an electronic mapped process into a corresponding user-interactive process checklist. The Checklist Generator identifies the specific electronic mapped process that is to be converted and identifies the one or more activities that make up the mapped process. These activities may comprise data identifying a sequential relationship between the activities in relation to each other as well as data identifying a task to be completed by a user, whether that user is an individual person or a computer system. The Checklist Generator then converts the identified activity or activities into a digital instance. Converting to the digital instance may comprise creating a user-interactive feature based on the data identifying the task, wherein the user-interactive feature comprises a data-entry component that is related to completion of the task and that allows for a corresponding and/or relevant data input. The Checklist Generator then configures the digital instance(s) to be in sequential order based on the data for identifying a sequential relationship for the activities; and then it generates the corresponding user-interactive process checklist, which comprises the digital instance(s) and a visual representation of the task-data, such as through a text or image In another embodiment, the process management system receives from a user device a request for converting a mapped process into a process checklist. Once received, the process management system authorizes credentials and generates an encrypted access token that is provided to the user device. The user device submits the request and accompanying encrypted access token to the process checklist application. Once the process checklist application authenticates the request using the encrypted access token, it converts the specified process into a process checklist, generates the process checklist, and provides the process checklist to the user device.

Configuration of the process checklist by the Checklist Generator may comprise Name, Creator, Due Date, and Status, and completion comments for an individual process-checklist list, as well as the process-checklist content itself. It may also comprise the Assignee, Due Date, Comments, Attachments, Completed By, and Completed Date and Time for each digital instance within a process checklist—all of which a user may alter at any time while the process checklist is in an active state and the user has sufficient privileges. The process checklist may retain the full history of all of its content and events so that it may be visualized.

To coordinate user-specific completion of the digital instances, the Checklist Generator may also identify data representing an ability for one or both of the user and the computer system to complete a task, and use that data to determine whether that user or system can complete the task. If it determines that one or both of the user and system have the ability to complete the task, the Checklist Generator may then configure the digital instance to be delegated to the user and/or system for completion of the task, and further generate a visual representation of that delegation, via text and/or images. In one embodiment, delegation of the task/digital instances may be done via email.

The Checklist Generator, through the process checklist system, may also create artifacts that represent user or system activity on the process checklist. It may do so by identifying a data-input entry by a user or computer system, wherein the entry was inputted into one of the digital instances; after which the Checklist Generator determines the activity that corresponds to that digital instance, and then creates an artifact that comprises content identifying the activity and the data-input entry. In some embodiments, the Checklist Generator may then transmit the created artifact back to the mapped process.

In some embodiments, the Checklist Generator may, similar to FIG. 1B, receive an update data from the electronic mapped process, wherein the update data comprises a change to one or both of: the data identifying the sequential relationship between the activity and the one or more activities, and the data identifying the user task. With this, the Checklist Generator may re-convert the digital instance, wherein re-converting the digital instance comprises one or both of: re-configuring the digital instance to be in sequential relationship based on the update data and re-creating the user-interactive feature based on the update data. After which, the Checklist Generator may re-generate the corresponding user-interactive process checklist, wherein the re-generated corresponding user-interactive process checklist comprises the re-converted digital instance.

Figure 2:
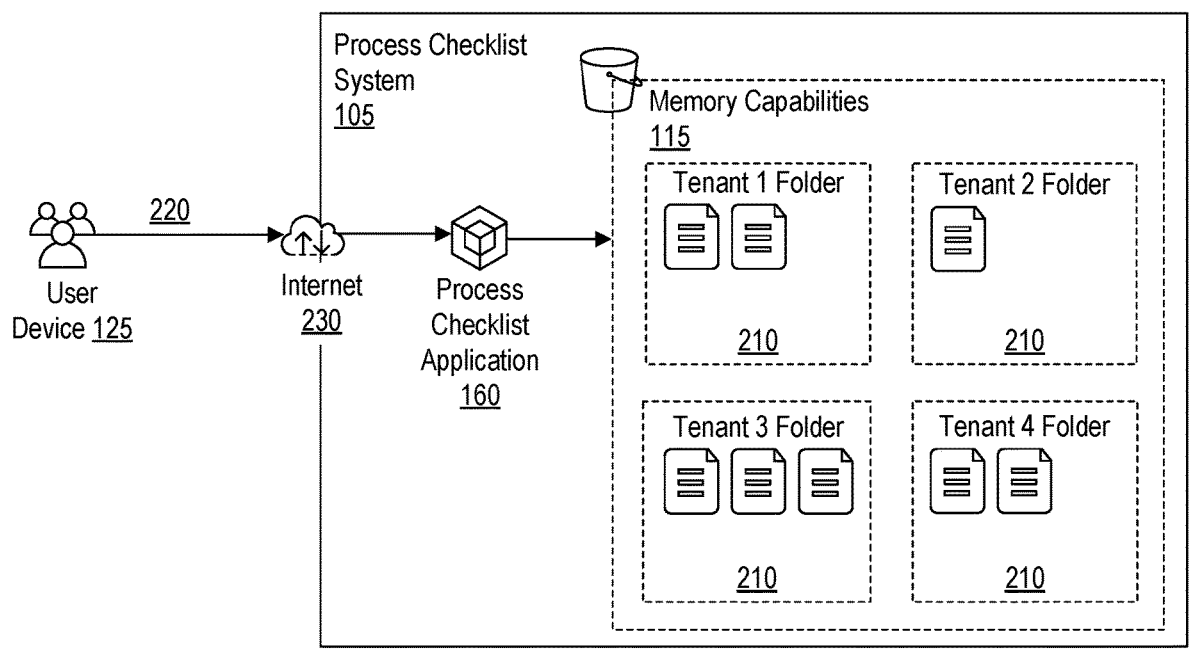
FIG. 2 is a schematic diagram generally illustrating an embodiment of the components of a process-checklist generator as disclosed herein.

FIG. 2 is a schematic diagram generally illustrating an embodiment of a process-checklist generator as disclosed herein. As shown in FIG. 2, the memory capabilities 115 of a process checklist system 105 may comprise tenant folders 210 for storing data pertinent to the processes and process checklists of one or more users (also referred to as tenants). The process checklist system 105 may be accessible over a local area network or wide area network 230, such as the Internet. In one embodiment, the memory capabilities 115 may comprise multiple tenant folders 210 for storing and organizing process checklist files. The process checklist application 110 may receive a process-checklist request 220 from a user device 125 and obtain workflow process or process-checklist data to fulfill the request from the memory capabilities 115. Specifically, it obtains data from the tenant folder that pertains to the user requesting the process checklist. Likewise, the process checklist application 110 also updates tenant folders 210 with new data pertaining to users' processes and/or process checklists.

Figure 3:
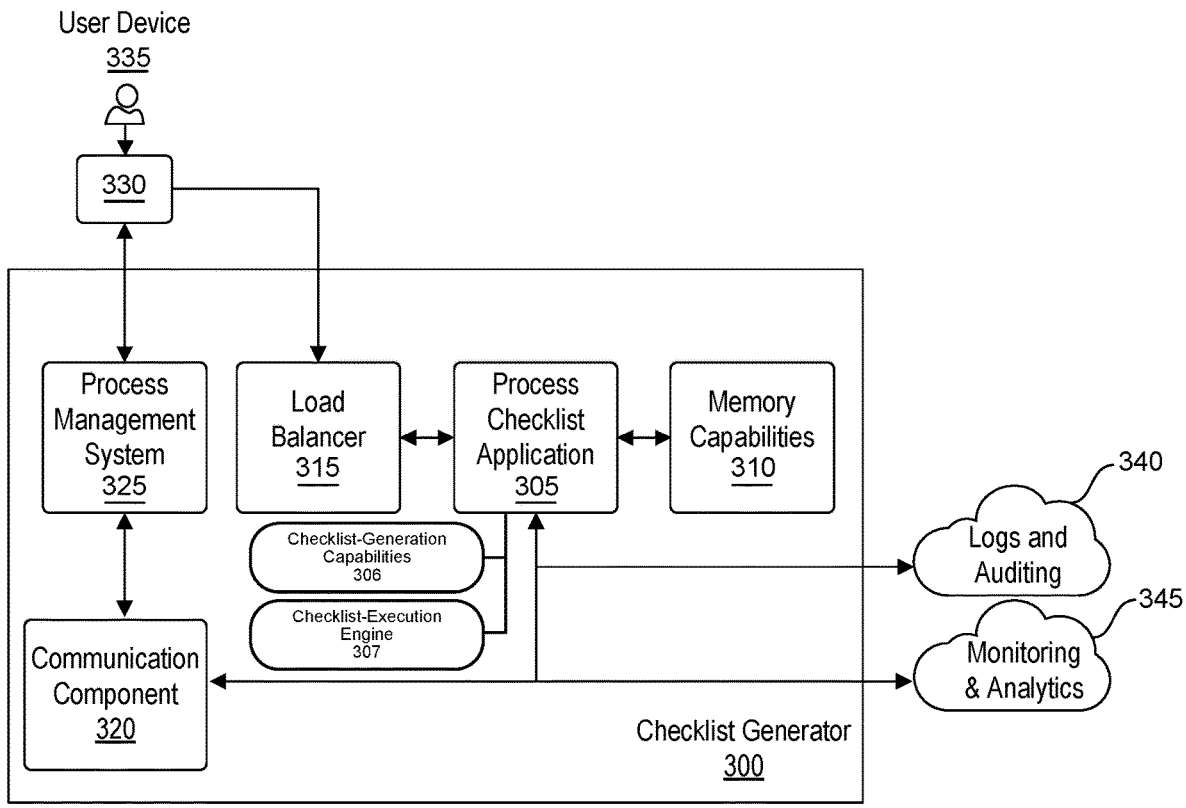
FIG. 3 is a schematic diagram generally illustrating an embodiment of a process-checklist generator as disclosed herein.

FIG. 3 is a schematic diagram generally illustrating an embodiment of a process-checklist generator as disclosed herein. As shown in FIG. 3, a system for a process-checklist generator 300 may comprise a process checklist application 305, memory capabilities 310, load balancing capabilities 315, communication components 320, and a process management system 325. The process checklist application 305 may comprise checklist-generation capabilities 306 and a checklist-execution engine 307. The Checklist Generator system 300 may be accessed by a user device 335 over a network 330. The Checklist Generator system 300 may communicate with external servers, devices, or programs to send and receive data relevant to logging and auditing 340 data and for monitoring and running analytics 345. Examples of logging and auditing 340 data include System event logs, system traces, and application performance metrics. Examples of monitoring and running analytics 345 include tools which provide visualizations for performance and system metrics, and alerting mechanisms triggered by events or thresholds configured for the captured metrics.

Within the generated process checklist, the Checklist Generator may enable users to append pictures, documents, or notes about the activity. This can serve as evidence of completion or further information for compliance tracking or improvement. Once completed, the Checklist Generator may provide users with a complete view and understanding of the process execution, including the time and date it was finished and timestamps for each signoff. By reviewing repeated checklists, users can pinpoint opportunities for improvements or potential automations that can further increase efficiency and effectiveness.

Figure 4:
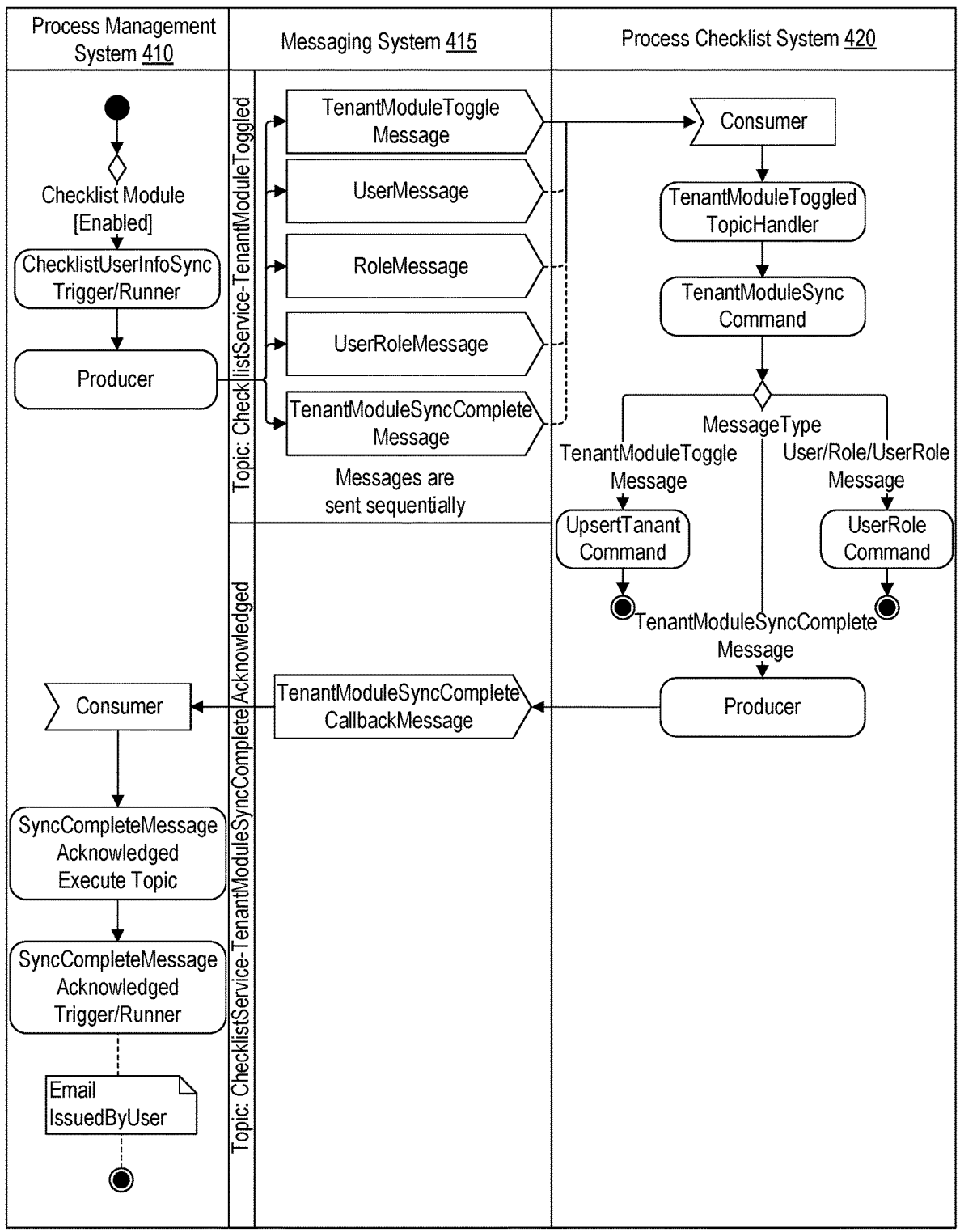
FIG. 4 is a schematic diagram generally illustrating an embodiment of a process-checklist generator as disclosed herein.

FIG. 4 is a schematic diagram generally illustrating an embodiment of a process-checklist generator as disclosed herein. As shown in FIG. 4, a process management system 410 may engage with a messaging system 415 to communicate with a process checklist system 420 for the purpose of synchronizing process checklist data and confirming that the process checklist system 420 is available to generate process checklists. In one embodiment, the process management system 410 receives a request for a process checklist, which triggers the production of a series of messages with tenant, user, role, and user-role information, sent through the messaging system 415. A trailing sync complete message may also be sent. These messages may be sent sequentially. The process checklist system 420 receives these messages, and when it identifies the sync complete message, the process checklist system 420 relays its own sync complete message acknowledged message to the process management system 410. The Process management system 410 consumes this message, which triggers the setting of the sync complete flag to true and a notification to the user, device, or system that requested the process checklist that a process checklist may be requested.

Figure 5:
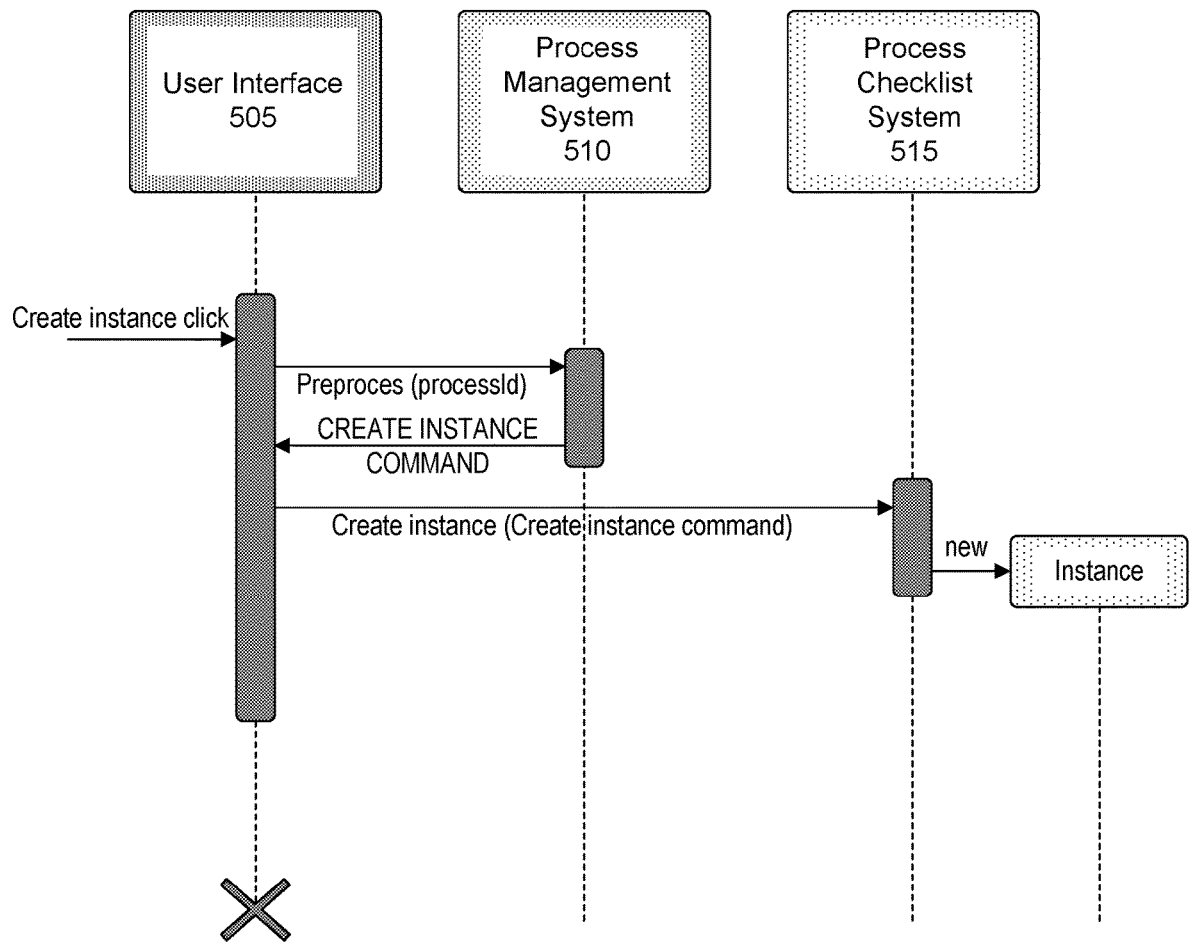
FIG. 5 is a schematic diagram generally illustrating an embodiment of a process-checklist generator as disclosed herein.

FIG. 5 is a schematic diagram generally illustrating an embodiment of a process-checklist generator as disclosed herein. As shown in FIG. 5, a Checklist Generator may create digital instances in a process checklist that correspond with the activities of a mapped process. In one embodiment, the creation of digital instances may be done via a sequence of interactions carried out between a user interface 505, a process management system 510, and a process checklist system 515. For example, the user interface may submit a request for a process checklist, which is received by the process management system 510. The process management system 510 returns a create instance command to the user interface 505, which the user interface 505 then provides that to the process checklist system 515. The process checklist system 515 receives and uses the create instance command to create one or more instances of the mapped process. In so doing, the Checklist Generator creates and generates a unique process checklist. In some embodiments, repeating the command does not result in then generating or accessing the same process checklist.

Figure 6:
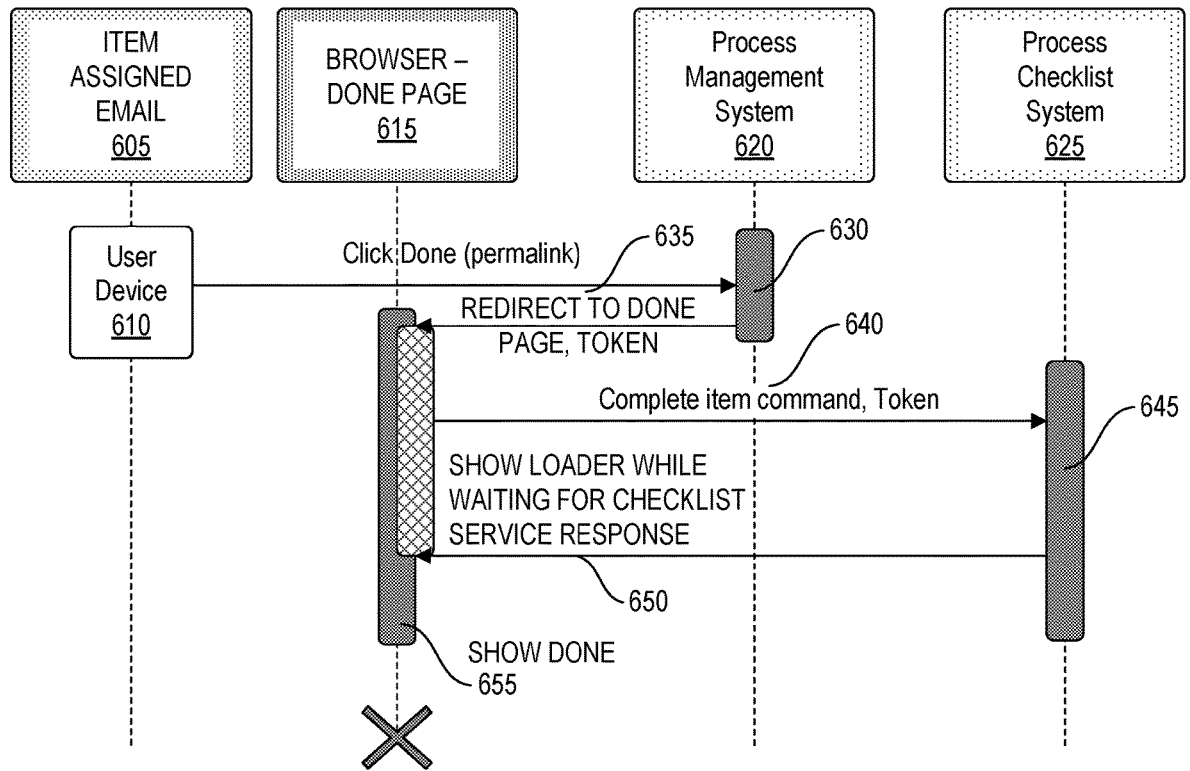
FIG. 6 is a schematic diagram generally illustrating an embodiment of a process-checklist generator as disclosed herein.

FIG. 6 is a schematic diagram generally illustrating an embodiment of a process-checklist generator as disclosed herein. Specifically, FIG. 6 generally illustrates an embodiment of communication capabilities of a process-checklist generator for tracking a process's completion. As shown in FIG. 6, the Checklist Generator may generate and send a notification 605 of an assigned action to a user device 610 and update the process checklist with data to reflect that the action has been completed 655. In one embodiment, the Checklist Generator comprises the process management system 620 and the process checklist system 625. In this embodiment, the process management system 620 communicates with the user device 610 via a network, such as an internet browser 615, and receives 630 data showing that the action has been completed. After receiving 630 this data, the process management system 620 generates a token 635 confirming that the action is complete. This token and confirmation are communicated 640 to the process checklist system 625, which updates 645 the process checklist accordingly. The process checklist system 625 then transmits 650 data reflecting completion of the action to the network, which receives the data and displays completion 655 of the action. In another embodiment, the Checklist Generator may not include the process management system 620, such that the Checklist Generator carries out its functionality with the process checklist system 625. In this embodiment, the process checklist system 625 communicates with user devices 610 and the process management system 620 via a network to notify users of assigned actions and receive and send data confirming that the actions have been completed.

In some embodiments, process checklists may be created from particular versions of a process. For example, one process checklist may be generated from version one of a process while a second process checklist may be generated from version two of the same process. In this embodiment, both process checklists may be completed in parallel while still maintaining the differences between the versions.

Figure 7:
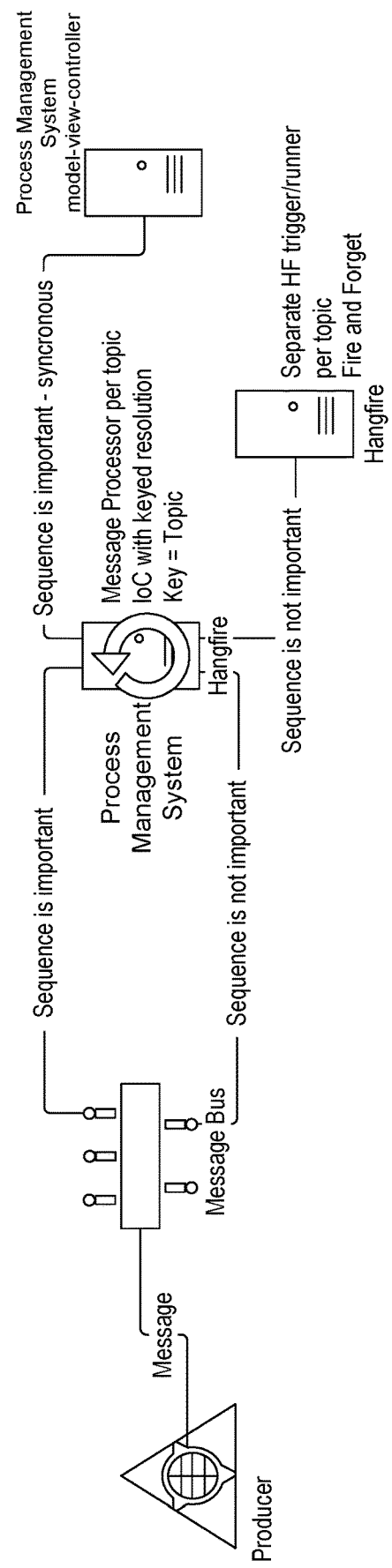
FIG. 7 is a schematic diagram generally illustrating an embodiment of communication capabilities of a process checklist generator.

FIG. 7 is a schematic diagram generally illustrating an embodiment of communication capabilities of a process checklist generator.

Figure 8:
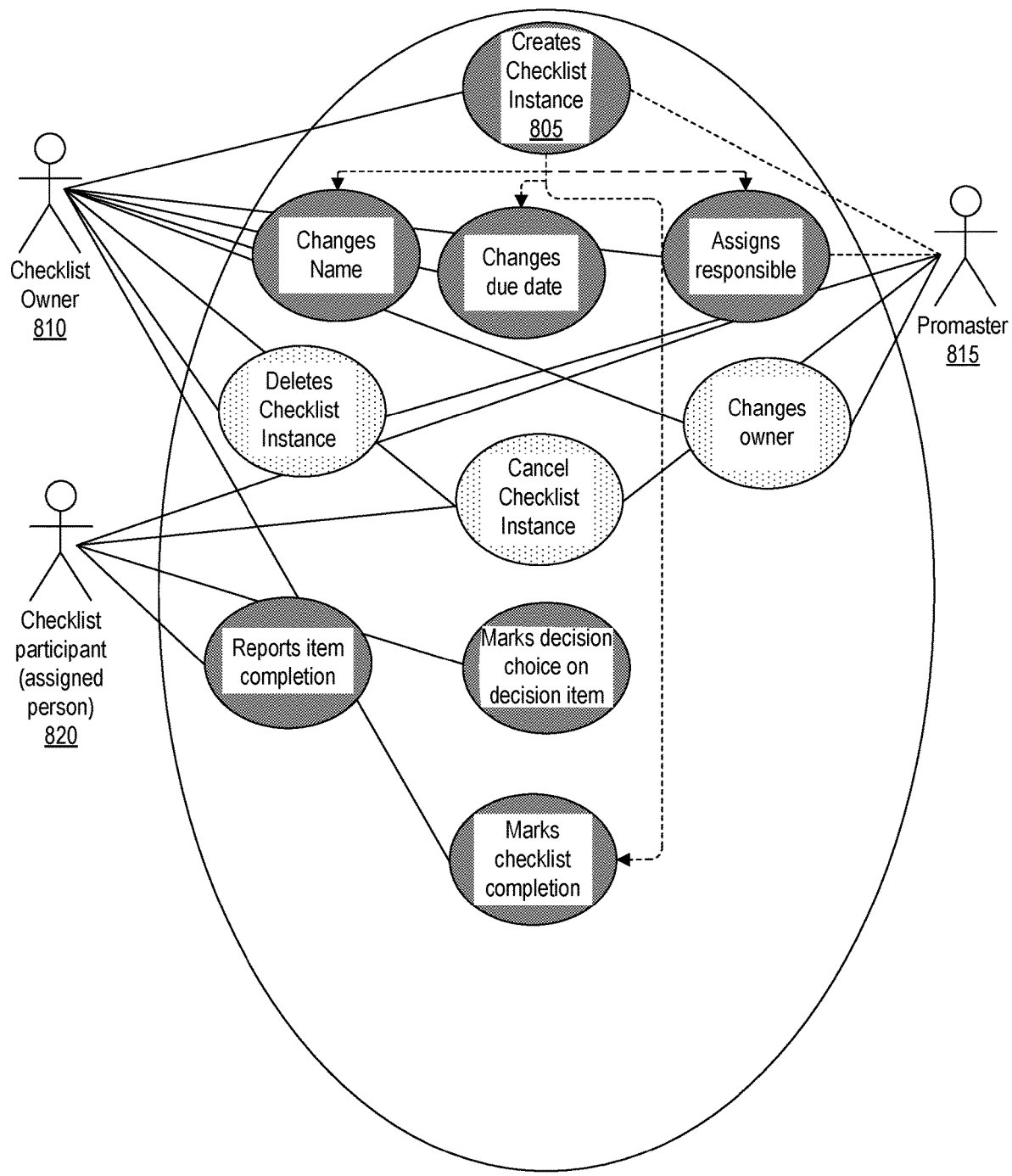
FIG. 8 is a schematic diagram generally illustrating an embodiment of a process-checklist generator as disclosed herein.

FIG. 8 is a diagram generally illustrating an embodiment of a process-checklist generator as disclosed herein. As shown in FIG. 8, multiple users may engage with a process-checklist generator for the purpose of maintaining and updating a process checklist. In one embodiment, a process checklist 805 of a process-checklist generator may be accessible by: a user 810 controlling ownership of the process and corresponding process checklist; a technical user 815 who has administrative duties over the process; and a user assigned 820 to an action within the process. As shown in FIG. 8, the Checklist Generator may provide for a number of actions to be taken on the process checklist 805. For example, the name, due dates, and assignments within the process checklist 805 may be edited, canceled, or deleted via the Checklist Generator. And the Checklist Generator may receive data that actions have been completed or a decision choice on a decision digital instance has been selected.

The Checklist Generator may tie the activities of a process together by connecting the people responsible at every step and providing greater visibility and accountability for the handovers between activities. For example, in a preferred embodiment, after generating a process checklist, the Checklist Generator may assist in and track the progress and completion of a process and its individual actions. To assist users in the completion of the process, the Checklist Generator may provide features that allow actions to be assigned to specific users. Or it may recommend assignees based on the process's documented role that is required to perform a particular step. The Checklist Generator may then communicate with the assigned users, such as when it generates and sends notifications to the assigned users that their action is due. The Checklist Generator may also generate and send emails to the assigned users, which emails may provide a one-click confirmation that the action has been completed so that there is no requirement for users to log in to the system or view the full checklist. The generated emails may also provide the ability to view the checklist for additional information. The Checklist Generator may also provide users with the ability to reassign activities to other users, which will then receive notification of the assigned activity.

As the Checklist Generator confirms changes to a mapped process, it may update the process checklist to reflect updates or changes made to the mapped process. For example, once a user has completed an assigned action within the mapped process, the Checklist Generator may update the process checklist with data that reflects the completed action.

The Checklist Generator may provide users with all of the process information to ensure easy compliance. As users complete the work required, the Checklist Generator may record their signoff for tracking purposes. These records of completed checklists provide a picture of the process execution that can provide valuable information for ongoing improvement of completion of the process.

FIG. 9 is an outline generally providing novel benefits of the process checklist generator. As shown in the left column of FIG. 9, current process technology poses significant process-management challenges at the governance, owner/expert, and participant levels. The right column of FIG. 9 shows how the Checklist Generator addresses and overcomes each of these challenges for every level.

In one embodiment, the Checklist Generator generates a data dashboard—an information management tool that visually tracks, analyzes, and displays activities relevant to process checklists. For example, each user may see the process-checklist activities they have due on their dashboard and the process checklist menu provides an overview of all existing process checklists, including a filter to see discarded and completed process checklists. This data may remain in memory storage as archive for compliance tracking, providing a record and supporting artifacts of what was done, when it was done, and by whom. The dashboard also provides a picture of process efficiency, highlighting any potential points for improvements or optimization that could benefit from automation or revision. The dashboard may also provide users with the ability to view upcoming tasks or tasks due and confirm that tasks have been completed. And the dashboard can provide methods for adding notes, images, documents, which allows for validation of processes and captures feedback and improvement ideas as tasks are completed.

Benefits of this disclosure include improving cross-team communication and coordination to ensure all process participants are informed regarding when their input or participation is required. Process users can clearly see their responsibilities as part of the end-to-end flow and are more conscious of handover points. The Checklist Generator also provides feedback opportunities for the line of business. For example, when exceptions or process breakdowns occur, the generated process checklists and corresponding information can be used for feedback and improvement suggestions, allowing users to log comments or attach documents for additional information. Increased compliance and accountability are additional outcomes of the process checklists generated by the Checklist Generator. By tracking the completed tasks, the Checklist Generator builds complete audit records and identifies who is responsible for every step, every time. Timestamped completions provide granular insight into timeframes for greater analysis and opportunities to increase process efficiency. Process checklists can also be used to validate a process manually, recognize potential improvements and optimize processes for automation. Benefits from the Checklist Generator also include providing a source of evidence for process compliance and completion and providing audit records that identify completion of tasks by users and time, which enables increased compliance with internal/external standards. This allows for reduced handover issues with clear instructions and personalized notifications for smoother, more efficient process execution.

Figure 10:
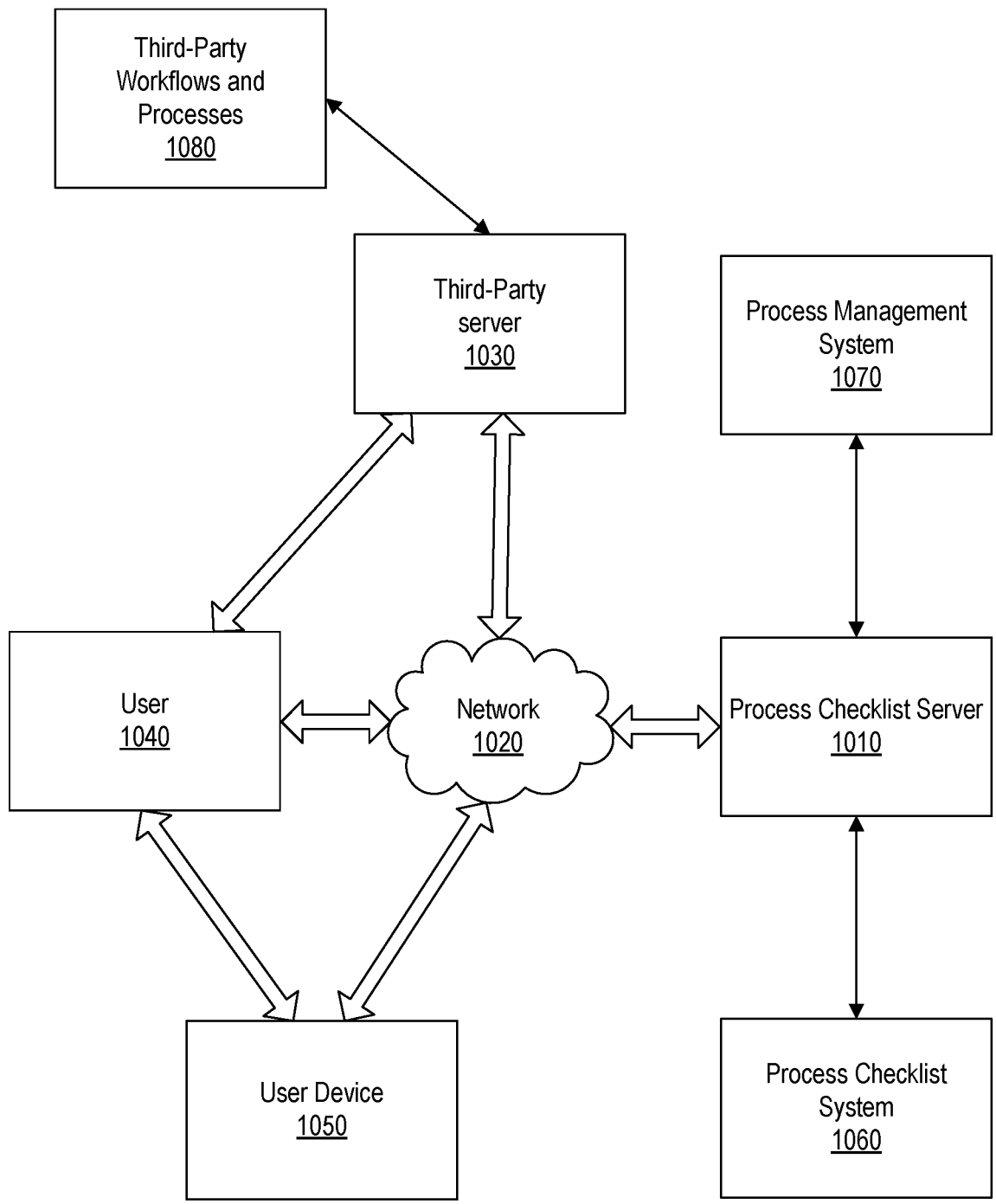
FIG. 10 is a functional block diagram generally illustrating an embodiment of a network system for a process-checklist generator as disclosed herein.

FIG. 10 is a functional block diagram generally illustrating an embodiment of a network system for a process checklist generator. A network system, as shown in FIG. 10, may comprise a process checklist server 1010 accessible over a local area network or a wide area network 1020, such as the Internet. The process checklist server 1010 may enable third party servers 1030, users 1040, and electronic devices 1050 to connect to the process checklist system GUI 1060. The process checklist server 1010 may also host process management system GUIs 1070, each accessible to their respective owners and other users.

In accordance with the preferred embodiment, the process checklist server 1010 is remotely accessible by a number of user computing devices 1050, including for example, laptops, smartphones, computers, tablets, and other computing devices that are able to access the local area network or a wide area network where the process checklist server 1010 resides. In normal operation, each user electronic device 1050 connects with the process checklist server 1010 to interact with the process checklist system GUI 1060 and any additional process management system GUIs 1070. As is also known, each additional process management system GUI 1070 may employ a number of connectors to interact with third party 1030 servers and their data, services, or applications 1080.

Figure 11:
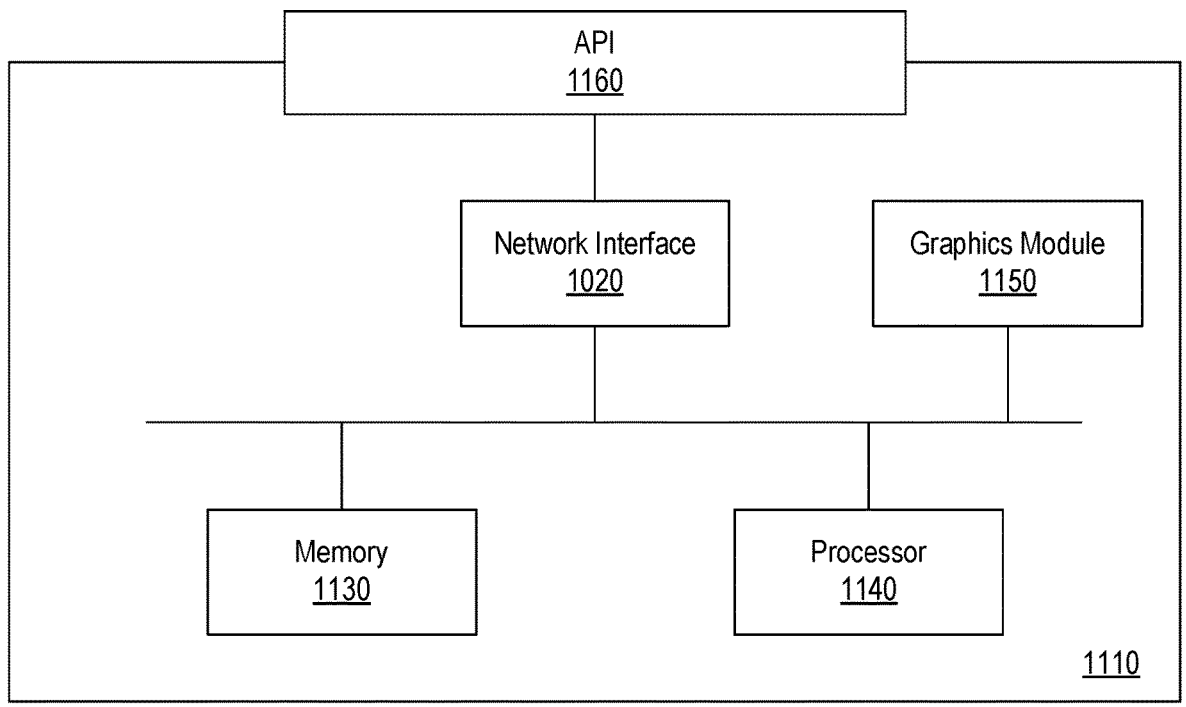
FIG. 11 is a functional block diagram generally illustrating an embodiment of a process-checklist generator as disclosed herein.

FIG. 11 is a functional block diagram generally illustrating an embodiment of an electronic device system for a process checklist generator. The electronic device 1110 may be coupled to a process checklist server 1010 via a network interface 1020. The electronic device 1110 generally comprises a memory 1130, a processor 1140, a graphics module 1150, and an application programming interface 1160. The electronic device 1110 is not limited to any particular configuration or system.

Other embodiments may include combinations and sub-combinations of features described or shown in the several figures, including for example, embodiments that are equivalent to providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, "feature" or "features" can refer to structures and/or functions of an apparatus, article of manufacture or system, and/or the steps, acts, or modalities of a method.

References throughout this specification to "one embodiment," "an embodiment," "an example embodiment," etc., indicate that the embodiment described may include a particular feature, structure, or characteristic, but every embodiment may not necessarily include that particular feature, structure, or characteristic. Moreover, such phrases are not necessarily referring to the same embodiment. Further, when a particular feature, structure, or characteristic is described in connection with one embodiment, it will be within the knowledge of one skilled in the art to affect such feature, structure, or characteristic in connection with other embodiments whether or not explicitly described.

Unless the context clearly indicates otherwise (1) the word "and" indicates the conjunctive; (2) the word "or" indicates the disjunctive; (3) when the article is phrased in the disjunctive, followed by the words "or both," both the conjunctive and disjunctive are intended; and (4) the word "and" or "or" between the last two items in a series applies to the entire series.

Where a group is expressed using the term "one or more" followed by a plural noun, any further use of that noun to refer to one or more members of the group shall indicate both the singular and the plural form of the noun. For example, a group expressed as having "one or more members" followed by a reference to "the members" of the group shall mean "the member" if there is only one member of the group.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

What is claimed:

1. A method of creating a user-interactive process checklist, comprising:
   receiving, by a process checklist server, a request for converting an electronic mapped process to a corresponding user-interactive process checklist,
      wherein the electronic mapped process is accessible by a process management server;
   receiving, by the process checklist server, at least one data synchronization message from the process management server comprising updated process data associated with the electronic mapped process;
   updating, by the process checklist server, a checklist process data corresponding to the electronic mapped process based at least in part on the updated process data of the at least one data synchronization message;
   sending, by the process checklist server to the process management server, a synchronization completion confirmation message indicating generation of user-interactive process checklists for the electronic mapped process is allowed;
   identifying, by the process checklist server, the electronic mapped process,
      wherein the electronic mapped process comprises one or more activities, and
      wherein the electronic mapped process resides in at least one of a memory component of the process management server or a memory component within a third-party server;
   identifying, by the process checklist server, the one or more activities of the electronic mapped process,
      wherein an activity of the one or more activities comprises data identifying a sequential relationship between the activity and the one or more activities, and wherein the activity further comprises data identifying a user task;
   converting, by the process checklist server, the activity to a digital instance,
      wherein converting the activity to the digital instance comprises creating a user-interactive feature based on the data identifying the user task, and
      wherein the user-interactive feature comprises a data-entry component that is in relation to completion of the user task and that allows for a data input by a user or a computer system;
   configuring, by the process checklist server, the digital instance to be in a sequential position in relation to digital instances corresponding to the one or more activities, based on the data identifying the sequential relationship between the activity and the one or more activities; and
   generating, by the process checklist server, the corresponding user-interactive process checklist,
      wherein the corresponding user-interactive process checklist comprises the digital instance and further comprises a visual representation of the data identifying the user task, and
      wherein the visual representation of the data identifying the user task is one of a text or an image.

2. The method of claim 1, further comprising:
   identifying, by the server, data representing an ability for one or both of the user and the computer system to complete the user task, wherein the data representing the ability for one or both of the user and the computer system to complete the user task resides in at least one of the memory component within the server, or the memory component within the third-party server;
   determining, by the server, whether the ability of one or both of the user and the computer system is sufficient to complete the user task, based on the data representing the ability for one or both of the user and the computer system to complete the user task;
   configuring, by the server, the digital instance to be delegated for completion by one or both of the user and the computer system, based on the determination that the ability of one or both of the user and the computer system is sufficient to complete the user task;
   generating, by the server, a visual representation of the delegation for completion of the digital instance, on the corresponding user-interactive process checklist, wherein the visual representation is one of a text or an image.

3. The method of claim 2, further comprising:
   transmitting, by the server, the delegation for completion of the digital instance via an email to at least one of the user and the computer system.

4. The method of claim 1, further comprising:
   identifying, by the server, a data-input entry by the user or the computer system, wherein the data-input entry is inputted into the digital instance;
   determining, by the server, the activity of the one or more activities corresponding to the identified digital instance into which the data-input entry was inputted;
   creating, by the server, an artifact of the data-input entry, wherein the artifact of the data-input entry comprises content identifying the activity and content identifying the data-input entry.

5. The method of claim 4, further comprising:
   transmitting, by the server, the artifact of the data-input entry to the electronic mapped process.

6. The method of claim 1, further comprising:
   receiving, by the server, an update data from the electronic mapped process, wherein the update data comprises a change to one or both of the data identifying the sequential relationship between the activity and the one or more activities, and the data identifying the user task;
   re-converting, by the server, the digital instance, wherein re-converting the digital instance comprises one or both of re-configuring the digital instance to be in sequential relationship based on the update data, and re-creating the user-interactive feature based on the update data;
   re-generating, by the server, the corresponding user-interactive process checklist, wherein the re-generated corresponding user-interactive process checklist comprises the re-converted digital instance.

7. The method of claim 1, further comprising:
   accessing, by the process checklist server, a set of checklist generation functions enabling creation of user-interactive process checklist components;
   generating, by the process checklist server, at least one digital instance template for the user-interactive process checklist corresponding to the electronic mapped process; and
   configuring, by the process checklist server, the at least one digital instance template to include the user-interactive feature associated with the activity of the one or more activities.

8. A non-transitory machine-readable medium comprising instructions that when executed by a data processing device, cause the data processing device to:
   receive a request for converting an electronic mapped process to a corresponding user-interactive process checklist, wherein the electronic mapped process is accessible by a process management server;
receive at least one data synchronization message from the process management server comprising updated process data associated with the electronic mapped process;
update a checklist process data corresponding to the electronic mapped process based at least in part on the updated process data of the at least one data synchronization message;
send to the process management server a synchronization completion confirmation message indicating generation of user-interactive process checklists for the electronic mapped process is allowed;
identify the electronic mapped process,
wherein the electronic mapped process comprises one or more activities, and
wherein the electronic mapped process resides in at least one of a memory component of the process management server or a memory component within a third-party server;
identify the one or more activities of the electronic mapped process,
wherein an activity of the one or more activities comprises data identifying a sequential relationship between the activity and the one or more activities, and
wherein the activity further comprises data identifying a user task;
convert the activity to a digital instance,
wherein converting the activity to the digital instance comprises creating a user-interactive feature based on the data identifying the user task, and
wherein the user-interactive feature comprises a data-entry component that is in relation to completion of the user task and that allows for a data input by a user or a computer system;
configure the digital instance to be in a sequential position in relation to digital instances corresponding to the one or more activities, based on the data identifying the sequential relationship between the activity and the one or more activities; and
generate the corresponding user-interactive process checklist,
wherein the corresponding user-interactive process checklist comprises the digital instance and further comprises a visual representation of the data identifying the user task, and
wherein the visual representation of the data identifying the user task is one of a text or an image.

9. The non-transitory machine-readable medium of claim 8, further comprising instructions that when executed by the data processing device, cause the data processing device to:
identify data representing an ability for one or both of the user and the computer system to complete the user task, wherein the data representing the ability for one or both of the user and the computer system to complete the user task resides in at least one of the memory component within the server, or the memory component within the third-party server;
determine whether the ability of one or both of the user and the computer system is sufficient to complete the user task, based on the data representing the ability for one or both of the user and the computer system to complete the user task;
configure the digital instance to be delegated for completion by one or both of the user and the computer system, based on the determination that the ability of one or both of the user and the computer system is sufficient to complete the user task;
generate a visual representation of the delegation for completion of the digital instance, on the corresponding user-interactive process checklist, wherein the visual representation is one of a text or an image.

10. The non-transitory machine-readable medium of claim 9, further comprising instructions that when executed by the data processing device, cause the data processing device to:
transmit the delegation for completion of the digital instance via an email to at least one of the user and the computer system.

11. The non-transitory machine-readable medium of claim 8, further comprising instructions that when executed by the data processing device, cause the data processing device to:
identify a data-input entry by the user or the computer system, wherein the data-input entry is inputted into the digital instance;
determine the activity of the one or more activities corresponding to the identified digital instance into which the data-input entry was inputted;
create an artifact of the data-input entry, wherein the artifact of the data-input entry comprises content identifying the activity and content identifying the data-input entry.

12. The non-transitory machine-readable medium of claim 11, further comprising instructions that when executed by the data processing device, cause the data processing device to:
transmit the artifact of the data-input entry to the electronic mapped process.

13. The non-transitory machine-readable medium of claim 8, further comprising instructions that when executed by the data processing device, cause the data processing device to:
receive an update data from the electronic mapped process, wherein the update data comprises a change to one or both of the data identifying the sequential relationship between the activity and the one or more activities, and the data identifying the user task;
re-convert the digital instance, wherein re-converting the digital instance comprises one or both of re-configuring the digital instance to be in sequential relationship based on the update data, and re-creating the user-interactive feature based on the update data;
re-generate the corresponding user-interactive process checklist, wherein the re-generated corresponding user-interactive process checklist comprises the re-converted digital instance.

14. The non-transitory machine-readable medium of claim 8, further comprising instructions that when executed by the data processing device, cause the data processing device to:
access a set of checklist generation functions enabling creation of user-interactive process checklist components;
generate at least one digital instance template for the user-interactive process checklist corresponding to the electronic mapped process; and
configure the at least one digital instance template to include the user-interactive feature associated with the activity of the one or more activities.

15. A system for creating a user-interactive process checklist, comprising:
a computer system having a hardware processor and a physical memory using executable instructions that, as a result of being executed by the hardware processor, cause the computer system to:
receive a request for converting an electronic mapped process to a corresponding user-interactive process checklist, wherein the electronic mapped process is accessible by a process management server;
receive at least one data synchronization message from the process management server comprising updated process data associated with the electronic mapped process;
update a checklist process data corresponding to the electronic mapped process based at least in part on the updated process data of the at least one data synchronization message;
send to the process management server a synchronization completion confirmation message indicating generation of user-interactive process checklists for the electronic mapped process is allowed;
identify the electronic mapped process,
wherein the electronic mapped process comprises one or more activities, and
wherein the electronic mapped process resides in at least one of a memory component of the process management server or a memory component within a third-party server;
identify the one or more activities of the electronic mapped process,
wherein an activity of the one or more activities comprises data identifying a sequential relationship between the activity and the one or more activities, and
wherein the activity further comprises data identifying a user task;
convert the activity to a digital instance,
wherein converting the activity to the digital instance comprises creating a user-interactive feature based on the data identifying the user task, and
wherein the user-interactive feature comprises a data-entry component that is in relation to completion of the user task and that allows for a data input by a user or a computer system;
configure the digital instance to be in a sequential position in relation to digital instances corresponding to the one or more activities, based on the data identifying the sequential relationship between the activity and the one or more activities; and
generate the corresponding user-interactive process checklist,
wherein the corresponding user-interactive process checklist comprises the digital instance and further comprises a visual representation of the data identifying the user task, and
wherein the visual representation of the data identifying the user task is one of a text or an image.

16. The system of claim 15, wherein the executable instructions further comprise instructions that, as a result of being executed by the hardware processor, cause the computer system to further:
identify data representing an ability for one or both of the user and the computer system to complete the user task, wherein the data representing the ability for one or both of the user and the computer system to complete the user task resides in at least one of the memory component within the server, or the memory component within the third-party server;
determine whether the ability of one or both of the user and the computer system is sufficient to complete the user task, based on the data representing the ability for one or both of the user and the computer system to complete the user task;
configure the digital instance to be delegated for completion by one or both of the user and the computer system, based on the determination that the ability of one or both of the user and the computer system is sufficient to complete the user task;
generate a visual representation of the delegation for completion of the digital instance, on the corresponding user-interactive process checklist, wherein the visual representation is one of a text or an image.

17. The system of claim 16, wherein the executable instructions further comprise instructions that, as a result of being executed by the hardware processor, cause the computer system to further:
transmit server, the delegation for completion of the digital instance via an email to at least one of the user and the computer system.

18. The system of claim 15, wherein the executable instructions further comprise instructions that, as a result of being executed by the hardware processor, cause the computer system to further:
identify a data-input entry by the user or the computer system, wherein the data-input entry is inputted into the digital instance;
determine the activity of the one or more activities corresponding to the identified digital instance into which the data-input entry was inputted;
create an artifact of the data-input entry, wherein the artifact of the data-input entry comprises content identifying the activity and content identifying the data-input entry.

19. The system of claim 18, wherein the executable instructions further comprise instructions that, as a result of being executed by the hardware processor, cause the computer system to further:
transmit the artifact of the data-input entry to the electronic mapped process.

20. The system of claim 15, wherein the executable instructions further comprise instructions that, as a result of being executed by the hardware processor, cause the computer system to further:
receive an update data from the electronic mapped process, wherein the update data comprises a change to one or both of the data identifying the sequential relationship between the activity and the one or more activities, and the data identifying the user task;
re-convert the digital instance, wherein re-converting the digital instance comprises one or both of re-configuring the digital instance to be in sequential relationship based on the update data, and re-creating the user-interactive feature based on the update data;
re-generate the corresponding user-interactive process checklist, wherein the re-generated corresponding user-interactive process checklist comprises the re-converted digital instance.

* * * * *